(12) United States Patent
Rowell et al.

(10) Patent No.: US 8,998,768 B2
(45) Date of Patent: Apr. 7, 2015

(54) HIGH TORQUE CAPACITY REVERSE CLUTCH

(71) Applicant: Sonnax Industries, Inc., Bellows Falls, VT (US)

(72) Inventors: Brian Rowell, Saxtons River, VT (US); Gregg Nader, Libertyville, IL (US)

(73) Assignee: Sonnax Industries, Inc., Bellows Falls, VT (US)

( * ) Notice: Subject to any disclaimer, the term of this patent is extended or adjusted under 35 U.S.C. 154(b) by 60 days.

(21) Appl. No.: 13/835,123

(22) Filed: Mar. 15, 2013

(65) Prior Publication Data

US 2014/0155217 A1 Jun. 5, 2014

Related U.S. Application Data

(60) Provisional application No. 61/733,283, filed on Dec. 4, 2012.

(51) Int. Cl.
*F16H 3/44* (2006.01)
*F16H 3/66* (2006.01)
*F16H 61/00* (2006.01)

(52) U.S. Cl.
CPC .......... *F16H 3/663* (2013.01); *Y10T 29/49464* (2015.01); *F16H 2061/0062* (2013.01); *F16H 2200/0034* (2013.01); *F16H 2200/2023* (2013.01); *F16H 2200/2005* (2013.01); *F16H 2200/2038* (2013.01)

(58) Field of Classification Search
CPC .............. F16H 3/44; F16H 2061/0062; F16H 2200/0034; F16H 2200/2038

USPC ................ 475/317, 319, 320, 321, 322, 338; 29/401.1

See application file for complete search history.

(56) References Cited

U.S. PATENT DOCUMENTS

| | | | | |
|---|---|---|---|---|
| 3,085,449 | A | * | 4/1963 | De Corte et al. ............... 477/159 |
| 3,188,887 | A | * | 6/1965 | Gabriel ............................ 475/41 |
| 4,922,599 | A | * | 5/1990 | Durfee .......................... 29/401.1 |
| 5,151,068 | A | * | 9/1992 | Mann et al. .................... 475/322 |
| 5,429,204 | A | * | 7/1995 | Tuholski ......................... 180/247 |
| 5,846,153 | A | * | 12/1998 | Matsuoka ...................... 475/269 |
| 6,920,970 | B1 | * | 7/2005 | Dumas ........................ 192/85.41 |
| 7,204,357 | B1 | * | 4/2007 | Dumas ........................ 192/85.43 |
| 7,232,398 | B2 | * | 6/2007 | Garcia et al. ................... 475/222 |
| 7,537,536 | B2 | * | 5/2009 | Hvolka et al. ................. 475/146 |
| 8,540,600 | B2 | * | 9/2013 | Kraynev et al. ................ 475/275 |
| 2003/0073534 | A1 | * | 4/2003 | Oshidari et al. .................... 475/5 |
| 2010/0193313 | A1 | * | 8/2010 | Shimizu et al. ................ 192/3.3 |
| 2011/0088991 | A1 | * | 4/2011 | Robinson .................... 192/219.4 |

* cited by examiner

*Primary Examiner* — Roger Pang
(74) *Attorney, Agent, or Firm* — Downs Rachlin Martin PLLC (57) ABSTRACT

A reverse clutch and planetary gear set are provided that can be installed in an automotive transmission. In some embodiments, the reverse clutch and planetary gear set are configured and dimensioned to be installed in a Powerglide transmission case. In other embodiments, the reverse clutch can have an increased mean diameter. In some embodiments, the reverse clutch can have an increased static holding capacity. In another embodiment, the planetary gear set can have a reduced numerical first gear ratio. In other embodiments, the planetary gear set can have components with increased strength. Methods for modifying a transmission to install a reverse clutch and planetary gear set are also provided.

20 Claims, 5 Drawing Sheets

HIGH TORQUE CAPACITY REVERSE CLUTCH

RELATED APPLICATION DATA

This application claims the benefit of priority of U.S. Provisional Patent Application Ser. No. 61/733,283, filed Dec. 4, 2012, and titled "High Torque Capacity Reverse Clutch That Consumes Less Space," which is incorporated by reference herein in its entirety.

FIELD OF THE INVENTION

The present invention generally relates to the field of automotive transmissions. In particular, the present invention is directed to reverse clutch and planetary gear assemblies in automotive transmissions, and more particularly to modifications to Powerglide-type transmissions.

BACKGROUND

The Powerglide transmission was one of the first automatic transmissions developed by General Motors. Although General Motors phased out the Powerglide transmission in 1973, the basic design is still used today, especially in niche automotive applications, including in automobile power trains designed for racing. The Powerglide transmission has remained popular for racing due, in part, to the strength, durability, and simplicity of the design. Indicative of the Powerglide's continued popularity, it is today possible to build an entire Powerglide transmission from aftermarket parts, and a cottage industry has developed around improving the performance of the Powerglide transmission in racing applications. Because of this history, entire transmissions as well as complete replacement parts built to original equipment ("OE") dimensions and specifications continue to be readily available in the market. Thus, for the sake of clarity, "OE Powerglide" as used herein refers not only to Powerglide transmissions and parts originally manufactured by General Motors but also to any aftermarket transmissions or parts conforming to the OE dimensions and specifications.

Figure 6:
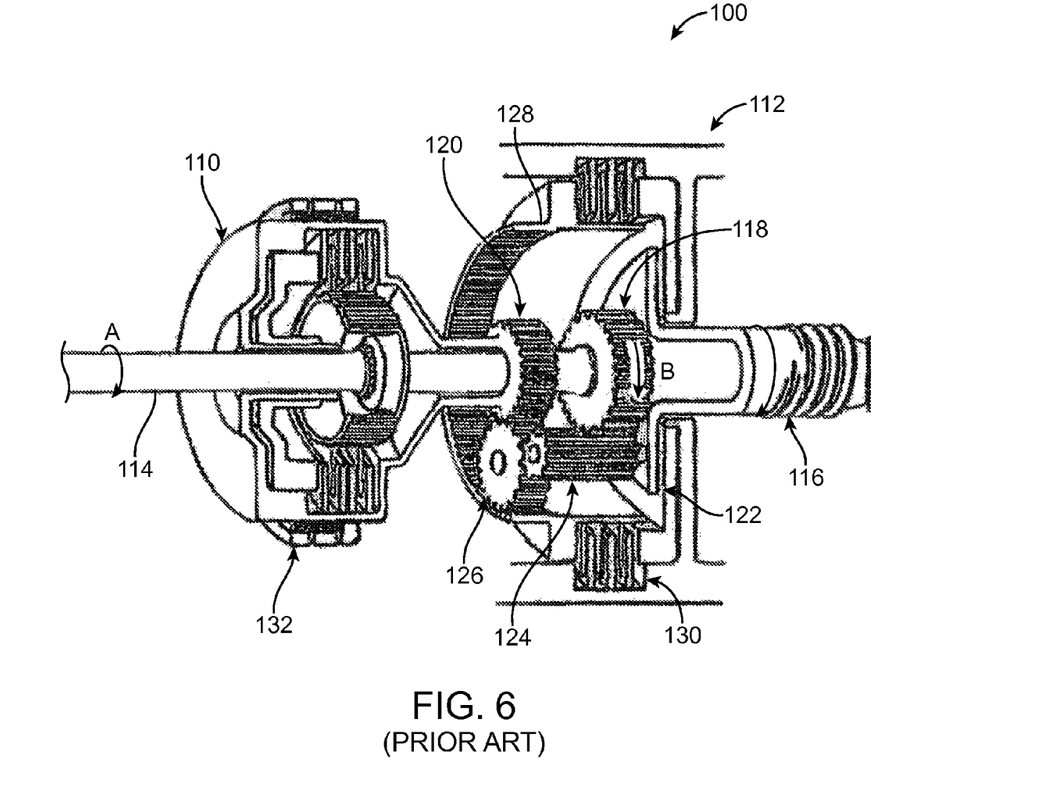
FIG. 6 is a cross-sectional view of a prior art OE Powerglide transmission.
Figure 7:
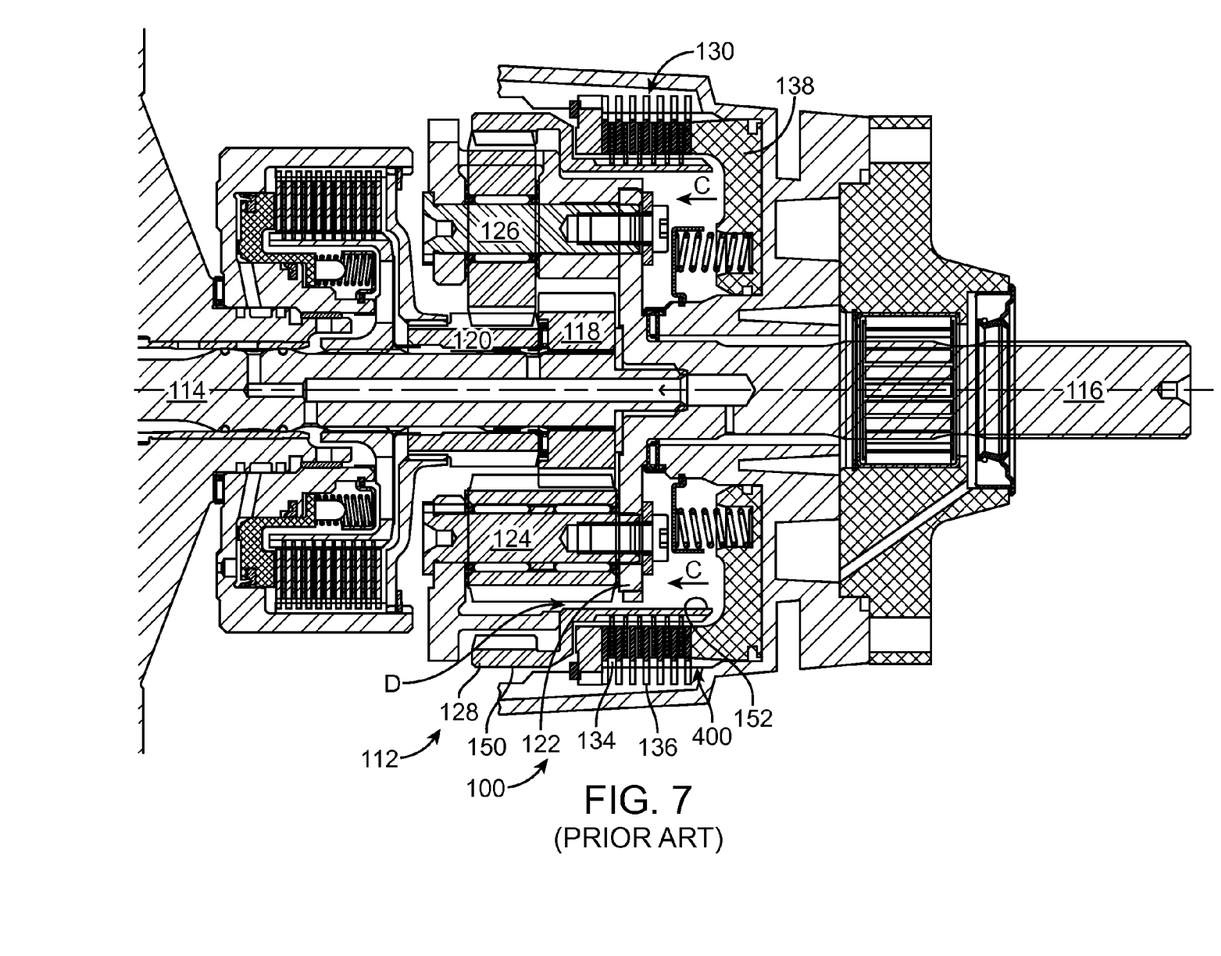
FIG. 7 is a cross-sectional view of the planetary gear portion of the OE Powerglide transmission of FIG. 6.

Because the present invention relates to new and nonobvious modifications of the OE Powerglide design, it is helpful to have a basic understanding of the OE Powerglide transmission to assist in understanding embodiments of the present invention. For this reason, FIGS. 6 and 7 are included to illustrate the OE Powerglide configuration. As shown in FIG. 6, OE Powerglide transmission 100 includes a clutch drum 110 that is rotatably coupled to a planetary gear portion 112. Power can be transmitted from, for example, an automobile engine (not shown) through an input shaft 114, the clutch drum 110, and the planetary gear portion 112, to an output shaft 116. The planetary gear portion 112 includes a two-speed compound planetary gear set coupled to a reverse clutch 130. The compound planetary gear set can include an input sun gear 118, a reaction sun gear 120, three long pinions 124 and three short pinions 126 and a ring gear 128 (only one long pinion 124 and one short pinion 126 are illustrated). As shown in FIGS. 6 and 7, the OE Powerglide input sun gear 118, reaction sun gear 120, long pinions 124, and short pinions 126 each have a substantially constant maximum outer diameter. Maximum outer diameter, as used herein, refers to the diameter of the gear measured from the tops of the gear teeth. The long pinions 124 and short pinions 126 are movably coupled to a planet carrier 122 which is coupled to the output shaft 116. As shown in FIGS. 6 and 7, the input sun gear 118 is meshed to the long pinions 124, which are meshed to the short pinions 126, which are in turn meshed to the reaction sun gear 120 and planetary ring gear 128. The OE Powerglide transmission 100 can be operated in different modes depending on the configuration of the various clutches and bands. For example, in first gear, a low band 132, which is grounded to the transmission case, is applied, which holds the clutch drum 110 and reaction sun gear 120 stationary. The input shaft 114 is coupled to the input sun gear 118 so that, when the input shaft 114 turns, for example in the direction indicated by arrow A, the input sun gear 118 also turns in that direction, as indicated by arrow B. Turning the input sun gear 118 causes the long pinions 124 to rotate, which causes the short pinions 126 to rotate. Because, in first gear, the clutch drum 110 and reaction sun gear 120 are held stationary by the low band 132, rotation of the input sun gear 118 forces the short pinions 126 to "walk" around the reaction sun gear 120 and turn the planetary carrier 122. Because the planetary carrier 122 is coupled to the output shaft 116, this also turns the output shaft 116.

FIG. 7 illustrates a cross-sectional view of the planetary gear portion 112 of the OE Powerglide transmission 100. As shown in FIG. 7, the reverse clutch 130 can include one or more fiction discs, or frictions, 134 that are coupled to the ring gear 128. The reverse clutch 130 also includes one or more separators 136 that are fixed to an inner surface 400 of a transmission case. The ring gear 128 can include a proximal gear portion 150 that meshes with the short pinions 126 and a distal flange portion 152 that couples to the reverse clutch 130 via the frictions 134. In operation, the reverse clutch 130 can be applied to hold the ring gear 128 stationary by applying an axial force in the direction indicated by arrow C with piston 138. Applying an axial force with the piston 138 can cause the friction discs 134 to be squeezed between the separators 136, which are grounded to the transmission case, holding the friction discs 134 and thus the ring gear 128 stationary.

The Powerglide transmission, in both OE designs and modern racing modifications, is a two-speed automatic transmission that includes a compound planetary gear assembly. OE Powerglide transmissions are sold with two different numerical first gear ratios. In one, the first gear, also known as the "low gear," has a numerical ratio of 1.76:1 and the second gear has numerical ratio of 1:1. This means that, in first gear, the input shaft must turn 1.76 rotations for one full rotation of the output shaft. The other OE Powerglide model has a numerical first gear ratio of 1.82:1 and a numerical second gear ratio of 1:1.

In applications with high horsepower to vehicle weight ratios, such as drag racing, it can be desirable to have a lower numerical first gear ratio to improve tire traction. For example, a lower numerical first gear ratio can improve tire traction when the vehicle launches from a stationary position by reducing the torque applied to the wheels. Various attempts have been made to reduce the numerical first gear ratio of the Powerglide transmission below the manufacturer-provided ratio of 1.76:1. Current designs, however, have failed to reduce the ratio below 1.65:1.

The first gear ratio of the Powerglide transmission can be calculated with the following equation:

$$\text{Numerical First Gear Ratio} = 1 + \frac{\text{Number of Teeth on Reaction Sun Gear}}{\text{Number of Teeth on Input Sun Gear}}$$

Accordingly, to decrease the numerical first gear ratio, the number of teeth on the input sun gear must be increased relative to the number of teeth on the reaction sun gear. However, space constraints within the Powerglide transmission case limit the extent to which the size of the input sun gear can be increased, and thus, limit the extent to which the numerical first gear ratio can be reduced. Some modified designs have attempted to accommodate a larger input sun gear by using a "stepped down" long pinion, which has two different portions, with each portion having a different number of teeth. However, this "stepped down" design is weaker and therefore undesirable.

Another aspect of the Powerglide transmission that has been the focus of modifications is the reverse clutch. Often when a Powerglide transmission is used for drag racing, it is modified so that the first gear and reverse gear can be engaged simultaneously. The first gear is engaged by applying the low forward band and the reverse gear is engaged by applying the reverse clutch. Engaging the first gear and reverse gear simultaneously allows the transmission to be used as a brake, holding the vehicle stationary with the engine revving to a higher RPM through the fluid coupling of the torque converter. The vehicle can then launch forward immediately when the reverse clutch is released. However, to effectively hold the vehicle stationary at near-maximum engine power, the holding capacity of low forward band and reverse clutch must be maximized. One way to increase the holding capacity of the low forward band and reverse clutch is to increase oil line pressure, however, this robs horsepower from the drivetrain system. While there are several alternative options available for increasing the holding capacity of the low forward band, there are minimal alternatives for increasing the holding the capacity of the reverse clutch.

Accordingly, there is a need for a lower numerical first gear ratio in a Powerglide-based transmission design. There is also a need for a high torque capacity reverse clutch that does not rob power from the drivetrain system.

SUMMARY OF THE DISCLOSURE

In one implementation, the present disclosure is directed to a two forward speed, one reverse speed automatic transmission. The transmission includes an OE Powerglide transmission case, and a compound planetary gear set disposed within the OE Powerglide transmission case and cooperating between an input shaft and an output shaft to provide a first forward gear and a second forward gear; wherein the first gear has a numerical ratio less than approximately 1.64:1.

In another implementation, the present disclosure is directed to a gear set and clutch assembly for a Powerglide-type automobile transmission, which includes a ring gear having a proximal gear portion and a distal flange portion, and a reverse clutch coupled to the distal flange portion of the ring gear, wherein the ring gear and reverse clutch are configured and dimensioned to receive and cooperate with a compound planetary gear set having a numerical first gear ratio less than approximately 1.64:1 within an OE Powerglide transmission case.

In still another implementation, the present disclosure is directed to a method of modifying a Powerglide-type automobile transmission to reduce a gear ratio thereof. The method includes increasing free space within an OE Powerglide transmission case sufficient to receive a planetary gear set with a first gear ratio less than approximately 1.64:1 and a long pinion having a substantially constant maximum outer diameter, and installing the planetary gear set in the OE Powerglide transmission case.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Various devices and methods are provided for improving the performance of an OE Powerglide transmission, and in particular, for increasing the holding capacity of the reverse clutch and decreasing the numerical first gear ratio. In one embodiment, a transmission based on the Powerglide design is provided that includes a larger space envelope between the ring gear and the planetary carrier which can expand the design options for the planetary gear set, including allowing for a lower numerical first gear ratio. Embodiments of the invention can also include an increased mean diameter reverse clutch, which can expand the space envelope and design options for the planetary gear set, and can also improve the torque capacity of the reverse clutch without robbing power from the drivetrain. A transmission according to the invention may then further include a compound planetary gear set that has a numerical first gear ratio less than 1.65:1. The compound planetary gear set can have an input sun gear with a greater number of teeth than an input sun gear in OE Powerglide transmissions without sacrificing strength or durability of the gear set.

Figure 1:
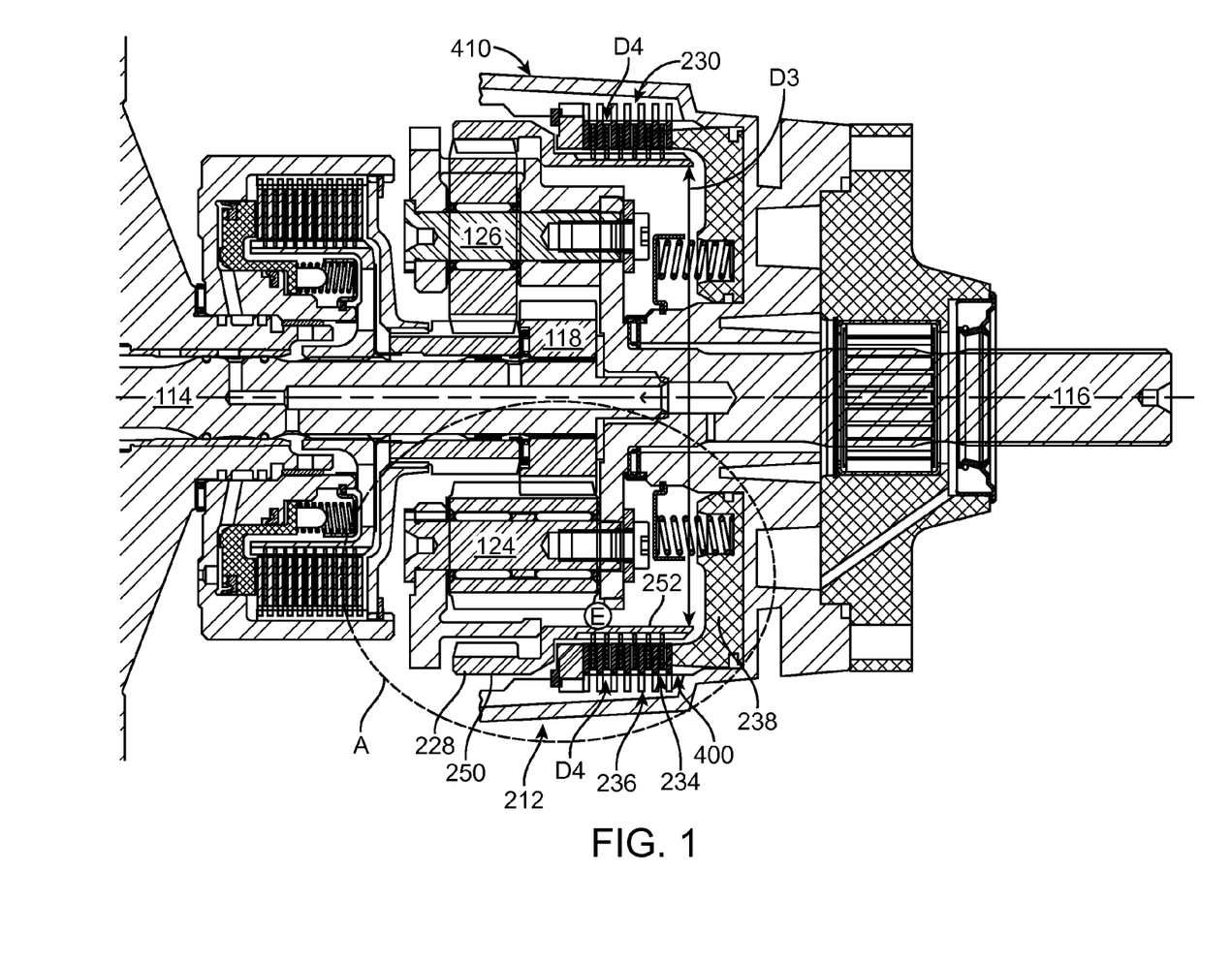
FIG. 1 is a cross-sectional view of a Powerglide-type transmission with a High Torque Capacity ("HTC") reverse clutch and an HTC planetary ring gear and an Original Equipment ("OE") Powerglide input sun gear, long pinions, and short pinions.

As shown in FIG. 1, an exemplary embodiment of the present invention comprises an OE Powerglide transmission case 410 containing a high torque capacity ("HTC") reverse clutch 230 having an increased mean diameter. High torque capacity as used herein generally refers to a horsepower/torque capacity of at least about 500 hp or 500 ft lbs of torque and in some embodiments up to about 3000 hp or about 1000-3000 hp. In this exemplary embodiment, the HTC reverse clutch 230 and a HTC ring gear 228 are used with an OE input sun gear 118 and OE long pinions 124. HTC reverse clutch 230 includes six HTC frictions 234 and seven HTC separators 236, however, this is for illustrative purposes only. In alternative embodiments, the number of either the HTC frictions 234 or the HTC separators can vary. As described more fully below, the HTC frictions 234 can have a greater inner diameter than the OE frictions 134, which can increase the static holding capacity of the HTC reverse clutch 230. The HTC ring gear 228 can have a proximal gear portion 250 that meshes with the short pinions 126, and a distal flange portion 252 that couples to the HTC reverse clutch 230 via the HTC frictions 234. As shown in FIG. 1, the internal diameter D3 of the HTC ring gear 228 is greater than the same internal diameter in the OE ring gear 128. Thus, the larger-diameter HTC ring gear 228 can couple to the HTC frictions 234 that can have a larger inner diameter than the OE frictions 134. A comparison of FIG. 1 to FIG. 7 shows how the larger-diameter HTC ring gear 228 and larger-diameter HTC reverse clutch 230 result in a space E between the ring gear 228 and the OE long pinion 124 that is greater than the space D between the OE ring gear 128 and OE long pinion 124. As discussed further below, the HTC reverse clutch 230 can therefore provide a greater design space that can be used to reduce the numerical first gear ratio and/or strengthen components in the planetary gear assembly. In the illustrated embodiment, the HTC frictions 234 also have a greater outer diameter than the outer diameter of OE frictions 134, and thus, the outer surfaces of the HTC frictions 234 are in closer proximity to an inner wall 400 of the Powerglide transmission case than the outer surface of the OE frictions 134.

Figure 2:
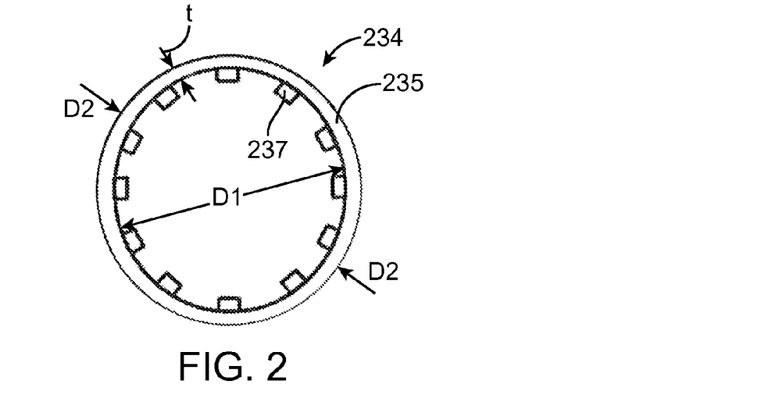
FIG. 2 is a top view of an HTC friction disc for use in a HTC reverse clutch.

FIG. 2 illustrates the HTC friction 234 for use in a HTC reverse clutch as described above in connection with FIG. 1. HTC friction 234 has a ring portion 235 and a plurality of tabs 237. The ring portion 235 can include a textured surface with a surface roughness that increases the frictional resistance between the friction 234 and a separator (not shown). The tabs 237 can be used to couple the HTC friction 234 to an outer surface of a ring gear (not shown). While the HTC friction 234 is shown with twelve tabs 237, this is for illustrative purposes only. In other embodiments, the HTC friction 234 can have any number of tabs 237, including less than or more than twelve. While in the illustrated embodiment, tabs 237 are used to couple the friction 234 to a ring gear, any other suitable method of fixing the HTC fiction 234 to a ring gear can be used. FIG. 2 shows the inner diameter D1, outer diameter D2, and thickness t of ring portion 235 in more detail. In the illustrated embodiment, as discussed above, inner diameter D1 of the HTC friction 234 is greater than the inner diameter of the OE friction 134, and the outer diameter D2 can be greater than the outer diameter of the OE friction 134. For example, the inner diameter can be in the range of approximately 5 inches to 10 inches, and in some embodiments, in the range of 6 inches to 7 inches, and in some embodiments, in the range of 6.1 inches to 6.5 inches. The outer diameter D2 can be in the range of approximately 5 inches to 10 inches, and in some embodiments, in the range of 6 inches to 8 inches, and in some embodiments, in the range of 6.5 inches to 7 inches. In addition, the thickness t of the HTC friction 234 can be less than the thickness of the OE friction 134. Thus, the HTC friction 234 can have a greater mean diameter than the OE friction 134. For example, the mean diameter of the HTC friction can be in the range of 5 inches to 10 inches, and in some embodiments, in the range of 6 inches to 8 inches, and in some embodiments, in the range of 6.2 inches to 6.5 inches. By comparison, the OE friction 134 has an inner diameter of approximately 5.8 inches and an outer diameter of approximately 6.47 inches resulting in a mean diameter of approximately 6.1 inches. Because the mean diameter of the HTC friction 234 can be greater than the mean diameter of the OE friction 134, an HTC reverse clutch incorporating the HTC frictions 234 can have a greater static holding capacity than the OE reverse clutch 130 even though the thickness t of the HTC friction 234 can be less than the thickness of the OE friction 134.

Figure 3:
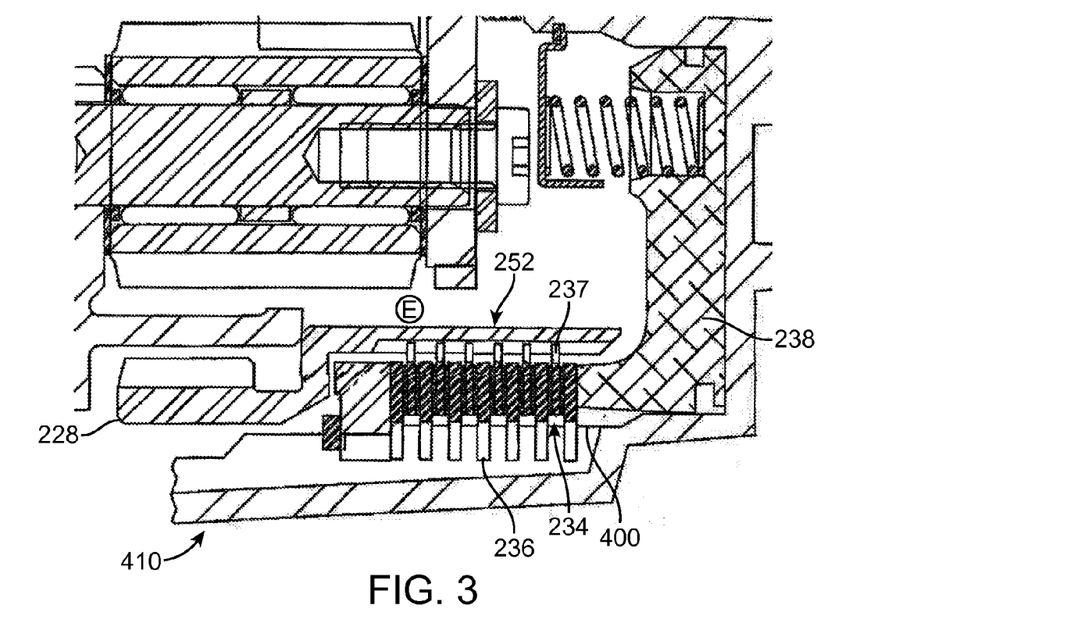
FIG. 3 is a magnified view of section A of the Powerglide-type transmission of FIG. 1.

FIG. 3 shows area A from FIG. 1 in more detail. As shown in FIG. 3, the HTC frictions 234 are coupled to the outer surface of the distal flange portion 252 of the HTC ring gear 228 and the HTC separators 236 are coupled to the inner wall 400 of the transmission case. As shown in FIG. 3, the tabs 237 of the HTC friction 234 extend into the outer wall of the distal flange portion 252 of the HTC ring gear 228 and tabs in the separators 236 extend into the inner wall 400 of the transmission case 410. In this exemplary embodiment, the outer diameters of the HTC reverse frictions 234 and the HTC separators 236 are in close proximity to the inner wall 400 and have therefore been maximized to maximize the mean diameter of the HTC reverse clutch 230 while still enabling the HTC reverse clutch 230 to fit within an OE Powerglide transmission case 410. For example, as shown in FIG. 1, the Powerglide transmission case 410 has an inner dimension D4 in the reverse clutch section. In the illustrated embodiment, the inner dimension D4 of the OE Powerglide transmission case 410 is approximately 6.7 inches. Thus, the illustrated HTC reverse clutch 230 has been designed to maximize static holding capacity while remaining compatible with a transmission case inner dimension of approximately 6.7 inches. In alternative embodiments, the HTC reverse clutch dimensions can be optimized for other transmission case dimensions, other combinations of static holding capacity, dynamic engaging capacity, and/or planetary gear design space.

Figure 4:
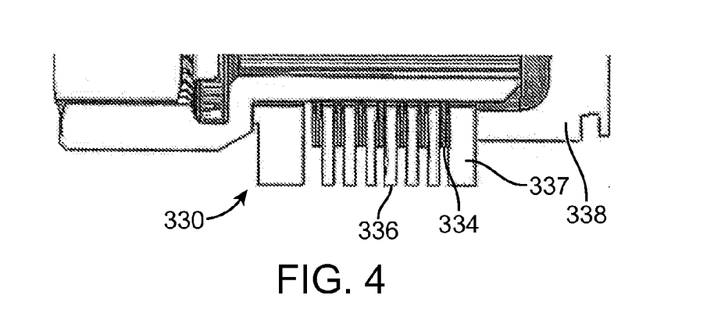
FIG. 4 is a cross-sectional view of a portion of an alternative embodiment of a HTC reverse clutch.

In some embodiments, the HTC separators can be further modified to strengthen one or more of the separators to modify the strength characteristics of the HTC reverse clutch. For example, FIG. 4 illustrates an alternative embodiment of a HTC reverse clutch 330 having a distal-most separator 337 with an increased thickness. FIG. 4 shows a partial view of an HTC reverse clutch 330 having seven HTC frictions 334 and eight HTC separators 336. As shown in FIG. 4, the thickness of the distal-most HTC separator 337 has been increased relative to the thickness of the HTC separators 236 illustrated in FIGS. 1 and 3. Increasing the thickness of one or more of the HTC separators 336 can improve the performance of the HTC reverse clutch 330, for example, increasing the thickness of the separators can improve the ability of the piston 338 to adequately apply a uniform force to the HTC frictions 334.

As previously described, the numerical gear ratio of the Powerglide gear set is a function of the ratio of the number of teeth on the input sun gear to the number of teeth on the reaction sun gear. Thus, to lower the numerical first gear ratio, the number of teeth on the input sun gear must be increased relative to the number of teeth on the reaction sun gear. In past attempts to further lower the ratio, a portion of the long pinion was decreased in diameter to accommodate a larger input sun gear. This resulted in a weakening of the long pinion and thus a higher failure rate at the high torques experienced in the racing environment. But even with this unsatisfactory compromise, the lowest ratio that could be reached was about 1.65:1. Embodiments of the present invention avoid the past limitation because, as described above, more space is created within the OE housing and ring gear to permit a larger input sun gear without compromising the long pinion design.

Figure 5:
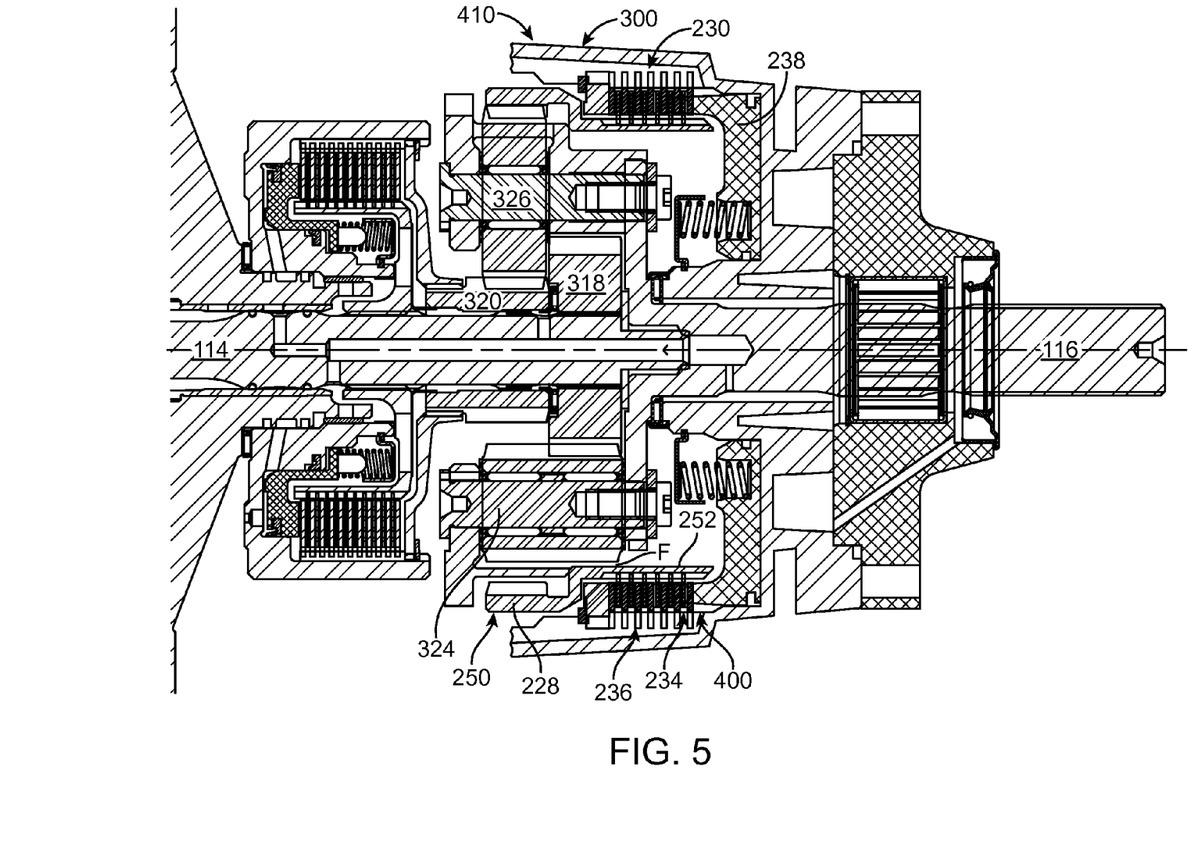
FIG. 5 is a cross-sectional view of a Powerglide-type transmission with the HTC reverse clutch and an HTC planetary ring gear of FIG. 1 combined with a reduced numerical first gear ratio planetary gear set.

FIG. 5 illustrates a further exemplary embodiment of the present invention that employs the advantages of the present invention to achieve a lower first gear ratio than previously thought possible in an OE Powerglide housing. As shown therein, transmission 300 includes the HTC reverse clutch 230 and the HTC ring gear 228 combined with a reduced numerical first gear ratio gear set. With the increased design space provided by the HTC reverse clutch 230, a broad range of numerical first gear rations can be designed. A person of ordinary skill in the art will recognize that many factors can influence the range of the numerical first gear ratio, including the power rating of the transmission, and the strength of the materials used to construct the transmission components, including the materials used to construct the planetary gear set components. For example, planetary gear sets with a numerical first gear ratio in the range of approximately 1.50:1 to 1.84:1 could be incorporated into the HTC reverse clutch 230. And with higher-strength materials used in some automotive applications, gear sets with first gear ratios in the range of approximately 1.40:1 to 1.50:1 could be used. In the illustrated embodiment, the numerical first gear ratio has been reduced from the OE Powerglide transmission first gear ratio by including a larger input sun gear 318 that has a larger number of teeth than the OE input sun gear 118 and a smaller reaction sun gear 320 that has less teeth than the OE sun gear 120. For example, the number of teeth on the input sun gear 318 can be in the range of 35 teeth to 40 teeth, the number of teeth on the long pinions can be in the range of 17 teeth to 19 teeth, and the number of teeth on the reaction sun gear 320 can be in the range of 20 to 25 teeth. For example, in the illustrated embodiment, the input sun gear has 38 teeth, the long pinions have 18 teeth, and the reaction sun gear has 22 teeth, resulting in a numerical first gear ratio of 1.58:1. By comparison, in a OE Powerglide transmission with a 1.76:1 first gear ratio, the input sun gear has 34 teeth, the long pinion has 20 teeth, and the reaction sun gear has 26 teeth. Table 1 compares the number of teeth on the planetary gear components in the illustrated embodiment to the number of teeth on the components in the OE Powerglide 1.76:1 transmission.

TABLE 1

| Planetary Gear Set Component | Exemplary Embodiment | OE Powerglide (1.76:1) |
| --- | --- | --- |
| Input Sun Gear | 38 | 34 |
| Long Pinion | 18 | 20 |
| Short Pinion | 32 | 34 |
| Reaction Sun Gear | 22 | 26 |
| Numerical 1$^{st}$ Gear Ratio | 1.58 | 1.76 |

In other exemplary embodiments, the number of teeth on any of the input sun gear 318, long pinion 324 and/or reaction sun gear 320 can be changed to change the first gear ratio. In the embodiment of FIG. 5, the diameter of the input sun gear 318 is larger than the diameter of the OE input sun gear 118, which results in the long pinions 324 being positioned at a greater radial distance from the center of the planetary gear set. This results in a smaller space F between the long pinion 324 and the HTC ring gear 228 than the space E between the OE long pinion 124 and the HTC ring gear 228. In addition, the illustrated embodiment has a reduced numerical first gear ratio without having any unnecessarily weakened gears, such as "stepped down" long pinions. Thus, the illustrated planetary gear set has a reduced numerical first gear ratio and a long pinion with a substantially constant maximum outer diameter. The larger inner diameter HTC reverse clutch can therefore enable a reduced numerical first gear ratio without compromising the strength of the planetary gear components.

In further alternative embodiments, the increased space provided by the HTC reverse clutch 230 can be utilized in other ways. For example, a different combination of gear sizes and dimensions can be selected to obtain different combinations of numerical first gear ratios and gear strengths. For example, the number of teeth on the input sun gear and reaction sun gear can be kept the same as the OE Powerglide input sun gear and reaction sun gear and the tooth thickness and wall thicknesses of the gears can be increased to increase the strength and durability of the planetary gear set, which can increase the torque capacity of the transmission. The HTC reverse clutch 230 can therefore simultaneously enable two design goals of reducing the numerical first gear ratio of a Powerglide transmission below 1.65 and increasing the static holding capacity of the reverse clutch without robbing horsepower from the engine.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A High Torque Capacity (HTC) reverse clutch kit for modifying a Powerglide-type automobile transmission having a OE Powerglide transmission case comprising:
   a plurality of frictions each having an inner diameter and a friction surface area; and
   a plurality of separators configured for operable engagement with the plurality of frictions;
   wherein said plurality of frictions and plurality of separators are configured and dimensioned for assembly into a reverse clutch configured for operation within the OE Powerglide transmission case, each of the plurality of frictions having a smaller friction surface area than a OE Powerglide reverse clutch friction and the reverse clutch having a larger static holding capacity than a OE Powerglide reverse clutch, the reverse clutch being configured and dimensioned to receive and cooperate with a high torque capacity compound planetary gear set having at least one of a numerical first gear ratio equal to or less than approximately 1.64:1, or a higher torque capacity than a OE Powerglide planetary gear set.

2. The HTC reverse clutch kit of claim 1, further comprising a high torque capacity compound planetary gear set comprising an input sun gear, a long pinion, and a reaction sun gear, wherein the input sun gear is meshed to the long pinion, and the long pinion is meshed to the input sun gear and the reaction sun gear, and wherein the planetary gear set has a numerical first gear ratio in the range of approximately 1.64:1 to 1.45:1.

3. The HTC reverse clutch kit of claim 2, wherein the long pinion has a proximal end and a distal end and a plurality of teeth extending therebetween, the long pinion having the same number of teeth at the proximal end and the distal end.

4. The HTC reverse clutch kit of claim 2, wherein the number of teeth on the input sun gear is in the range of approximately 35 teeth to 40 teeth.

5. The HTC reverse clutch kit of claim 2, wherein the number of teeth on the long pinion is in the range of approximately 15 teeth to 20 teeth.

6. The HTC reverse clutch kit of claim 2, wherein the number of teeth on the reaction sun gear is in the range of approximately 20 teeth to 25 teeth.

7. The HTC reverse clutch kit of claim 2, wherein the numerical first gear ratio of the planetary gear set is in the range of approximately 1.60:1 to 1.56:1.

8. The HTC reverse clutch kit of claim 2, wherein the reverse clutch has a mean diameter that is in the range of approximately 6.2 to 6.5 inches.

9. The HTC reverse clutch kit of claim 8, wherein the plurality of separators comprises a first separator configured for contact with a clutch piston having a thickness greater than other ones of said plurality of separators.

10. A method of modifying a Powerglide-type automobile transmission to increase a reverse clutch holding capacity and reduce a gear ratio thereof, comprising:
    reducing a friction surface area of at least one friction in the reverse clutch;
    increasing free space within an OE Powerglide transmission case sufficient to receive a planetary gear set with a first gear ratio equal to or less than approximately 1.64:1 and a long pinion having a substantially constant maximum outer diameter; and
    installing said planetary gear set in said OE Powerglide transmission case.

11. The method of claim 10, wherein said increasing step comprises:
    installing a ring gear in the OE Powerglide transmission case, the ring gear having an inner diameter capable of housing a two-speed compound planetary gear set having a numerical first gear ratio in the range of approximately 1.64:1 to 1.45:1; and
    installing a reverse clutch capable of housing a two-speed compound planetary gear set having a numerical first gear ratio in the range of approximately 1.64:1 to 1.45:1.

12. The method of claim 10, wherein the long pinion has 17-19 teeth.

13. The method of claim 10, wherein the planetary gear set comprises an input sun gear having a plurality of teeth, wherein the number of teeth is in the range of approximately 35 teeth to 40 teeth.

14. The method of claim 10, wherein the long pinion has substantially the same configuration as an OE Powerglide long pinion.

15. The method of claim 11, wherein the at least one friction has an inner diameter in the range of approximately 6 inches to 6.5 inches.

16. The method of claim 11, wherein the reverse clutch has a mean diameter that is in the range of approximately 6.2 inches to 6.5 inches.

17. The method of claim 16, wherein the reverse clutch comprises a plurality of interleaved frictions and separators, a first said separator configured for contact with a clutch piston having a thickness greater than other said separator plates.

18. A method of modifying a Powerglide-type automobile transmission having an OE Powerglide transmission case, a reverse clutch having at least one friction, and a ring gear having an inner diameter defining a planetary gear set space, the method comprising:
    increasing a mean diameter of the at least one friction;
    decreasing a friction surface area of the at least one friction;
    increasing a static holding capacity of the reverse clutch; and
    increasing the planetary gear set space such that the modified Powerglide-type transmission is configured and dimensioned to receive a planetary gear set having at least one of a lower numerical gear ratio and higher strength than a OE Powerglide planetary gear set.

19. The method of claim 18, wherein said increasing the planetary gear set space step comprises increasing the planetary gear set space such that the modified Powerglide-type transmission is configured and dimensioned to have a planetary gear set having a first gear ratio of less than approximately 1.64:1 and a long pinion having a substantially constant maximum outer diameter.

20. The method of claim 19, wherein said decreasing a friction surface area step comprises decreasing the friction surface area of the at least one friction by at least approximately 2.5% and said increasing a static holding capacity step comprises increasing the static holding capacity of the reverse clutch by at least approximately 15%.

\* \* \* \* \*